(No Model.)
G. WINZENRIED.
COTTON HARVESTER.
No. 310,108. Patented Dec. 30, 1884.
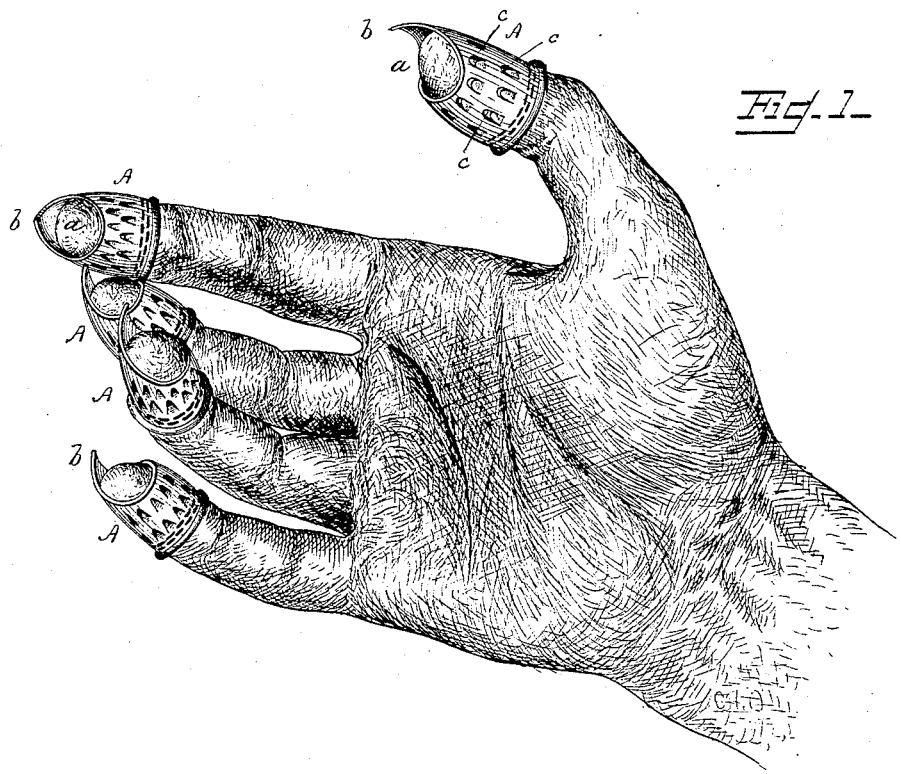
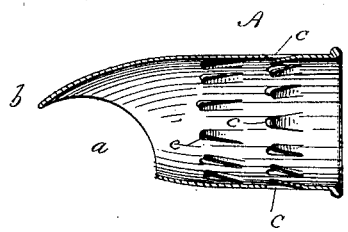
Godfrey Winzenried.
Inventor
WITNESSES
F. L. Ourand
E. W. Johnson
Attorney

UNITED STATES PATENT OFFICE.

GODFREY WINZENRIED, OF SCHULENBURG, TEXAS.

COTTON-HARVESTER.

SPECIFICATION forming part of Letters Patent No. 310,108, dated December 30, 1884.

Application filed December 20, 1883. (No model.)

*To all whom it may concern:*

Be it known that I, GODFREY WINZENRIED, a citizen of the United States of America, residing at Schulenburg, in the county of Fayette and State of Texas, have invented certain new and useful Improvements in Cotton-Harvesters; and I do hereby declare the following to be a full, clear, and exact description of the invention, such as will enable others skilled in the art to which it appertains to make and use the same, reference being had to the accompanying drawings, and to letters or figures of reference marked thereon, which form part of this specification.

This invention relates to certain new and useful improvements in devices for picking cotton from the bolls in the field, and its object is to provide thimbles which are adapted to be placed over the fingers and thumbs of a person, so as to provide artificial nails, whereby the cotton may be removed from the plants expeditiously, and which may be worn with comfort; and to this end my inventive consists in the construction of the thimbles, as will be hereinafter more fully set forth, and pointed out in the claims.

In the accompanying drawings, which illustrate my invention, Figure 1 is a view showing the same applied to a hand, and Fig. 2 is a sectional view.

A represents my improved finger attachment, which consists of thimbles having open ends $a$ and a pointed projection, $b$, the sides being cut away so as to provide curved portions, through which the ends of the fingers and thumbs of the wearer may project. The points $b$ are bent inward, as shown, so that the extreme ends may be below the ends of the wearer. The body or cylindrical portion of the thimble is provided with angular slits or kerfs, $c$, which are formed by cutting the metal so that the base of the triangular pieces between the slits will be toward the joints of the fingers and form spring-holders, the points projecting slightly inward, so as to catch upon the fingers and prevent an accidental displacement of the thimbles. By this construction I provide a device by which the cotton may be readily removed from the plants, and which to the wearer will not be inconvenient, and will preserve the sense of feeling at the ends of the fingers, as the ends of the thimbles are open and need not fit as tightly upon the fingers as to stop the circulation of the blood, the inwardly-projecting points retaining the same in position.

I am aware that prior to my invention cornhuskers have been provided with open ends and projecting portions or points, as shown in the patent of Sechrist, dated September 24, 1867, and also as shown in the patent of Gould, dated May 13, 1856, in which is shown a cover for the tip of the finger, having a closed end and projecting points; and I do not claim such as my invention, as the invention shown in the patent of Sechrist could not be used as a cotton-picker, and the invention shown in the patent of Gould is also objectionable as a cotton-picker, as to use the same the person would have to rely entirely upon his sight, which is impracticable in picking cotton. Finger attachments have also been provided for picking plants; but their construction, so far as I am aware, is such that they would not serve the purpose of my invention.

Having thus described my invention, what I claim as new, and desire to secure by Letters Patent, is—

1. As a new article of manufacture, thimbles adapted to be placed over the tips of the fingers for the purpose of facilitating cotton-picking, consisting of the body A, having inwardly-projecting points, open ends $a$, and inwardly-curved points $b$, substantially as shown.

2. A thimble for cotton-picker's use, consisting of a body with spring-holders having their points bent inward, open ends, and projecting picking-points $b$, substantially as shown.

In testimony whereof I affix my signature in presence of two witnesses.

GODFREY WINZENRIED.

Witnesses:
C. WILLRICH,
L. SCHLOTTMANN.